(12) United States Patent
Huang et al.

(10) Patent No.: US 9,436,611 B2
(45) Date of Patent: Sep. 6, 2016

(54) PROCESSOR, CACHE MEMORY OF THE PROCESSOR AND CONTROL METHOD OF THE PROCESSOR

(71) Applicant: NATIONAL SUN YAT-SEN UNIVERSITY, Kaohsiung (TW)

(72) Inventors: Ing-Jer Huang, Kaohsiung (TW); Chun-Hung Lai, Kaohsiung (TW)

(73) Assignee: NATIONAL SUN YAT-SEN UNIVERSITY, Kaohsiung (TW)

(*) Notice: Subject to any disclaimer, the term of this patent is extended or adjusted under 35 U.S.C. 154(b) by 179 days.

(21) Appl. No.: 14/256,565

(22) Filed: Apr. 18, 2014

(65) Prior Publication Data

US 2015/0113228 A1 Apr. 23, 2015

(30) Foreign Application Priority Data

Oct. 21, 2013 (TW) .............................. 102137922 A

(51) Int. Cl.
*G06F 12/00* (2006.01)
*G06F 11/34* (2006.01)
*G06F 11/36* (2006.01)
*G06F 12/08* (2016.01)

(52) U.S. Cl.
CPC .......... *G06F 12/0864* (2013.01); *G06F 11/34* (2013.01); *G06F 11/364* (2013.01); *G06F 11/3636* (2013.01); *G06F 11/3648* (2013.01); *G06F 12/0848* (2013.01); *G06F 2212/1044* (2013.01)

(58) Field of Classification Search
CPC .......... G06F 12/0864; G06F 12/0848; G06F 11/3636; G06F 11/364
See application file for complete search history.

(56) References Cited

U.S. PATENT DOCUMENTS

| | | | |
|---|---|---|---|
| 2004/0117690 A1* | 6/2004 | Andersson | G06F 11/3636 714/45 |
| 2006/0117224 A1* | 6/2006 | Wu | G06F 11/2236 714/38.12 |
| 2008/0065810 A1* | 3/2008 | Spanel | G06F 11/348 711/3 |
| 2008/0320333 A1* | 12/2008 | Watson | G06F 11/3636 714/38.11 |
| 2009/0070531 A1* | 3/2009 | Venkumahanti | G06F 9/381 711/125 |
| 2011/0307741 A1 | 12/2011 | Chen et al. | |
| 2012/0216079 A1* | 8/2012 | Fai | G06F 11/362 714/42 |
| 2012/0311405 A1 | 12/2012 | Kanai et al. | |
| 2012/0314512 A1 | 12/2012 | Kurokawa | |

FOREIGN PATENT DOCUMENTS

TW 201145016 A1 12/2011

OTHER PUBLICATIONS

Lai et al., A Trace-Capable Instruction Cache for Cost-Efficient Real-Time Program Trace Compression in SoC, IEEE Transactions on Computers, Oct. 14, 2010, pp. 1665-1677, vol. 60, IEEE, USA.

* cited by examiner

*Primary Examiner* — Aracelis Ruiz
(74) *Attorney, Agent, or Firm* — Muncy, Geissler, Olds & Lowe, P.C.

(57) ABSTRACT

A processor capable of storing trace data is disclosed. The processor includes a core adapted to execute programs, as well as a cache memory electrically connected to the core. The cache memory includes a core way and a trace way. The core way is adapted to store data that is required when the core executes the programs. The trace way is adapted to store data that is generated during debugging operations of the core. A control method of the processor is also disclosed.

21 Claims, 8 Drawing Sheets

PROCESSOR, CACHE MEMORY OF THE PROCESSOR AND CONTROL METHOD OF THE PROCESSOR

BACKGROUND OF THE INVENTION

1. Field of the Invention

The present invention generally relates to a processor, a cache memory of the processor and a control method of the processor and, more particularly, to a processor capable of storing trace data, a cache memory of the processor and a control method of the processor.

2. Description of the Related Art

A conventional processor generally includes a core and a cache memory. The core is used to execute programs. The cache memory includes a cache controller and a plurality of cache ways$_i$. Each cache way includes a data RAM$_i$, a tag RAM$_i$ and a write-back (WB) address RAM$_i$, which are used to store data frequently used by the core. If the outputted address of the core (including Tag, Set index, Byte Offset) has a value that is identical to the value of the tag RAM of any cache way, a cache hit is established. In this case, the data RAM of the cache way outputs the data of a cache line to the core according to the Set Index. To the contrary, if the outputted address of the core (including Tag, Set index, Byte Offset) has a value that is not identical to the value of the tag RAM of any cache way, a cache miss is established. In this case, a cache replacement policy is used to determine a cache way whose space is made available in order to store the data retrieved from a memory outside of the cache memory (hereinafter referred to as an external memory, such as the main memory), and the data of the data RAM of the cache way is copied to a write buffer. The data of the write buffer is written back to the corresponding address of the external memory when the system is idle.

To minimize the possible abnormalities during the executions of programs, a trace generation unit is often used to debug the core during the phases of designing, verification and mass production of the conventional processor. Some conventional trace generation units generate signals to verify the results of the core executing programs, and temporarily store the verified results in a dedicated memory of the trace generation unit during the verification process. Such conventional trace generation units include TC1766ED and TC1796ED of Infineon Inc, Xtensa of Tensilica Inc, MPC565 of Freescale Inc, V850 of NEC Inc, ETM of ARM Inc, or PDTrace of MIPS Inc.

Although the conventional trace generation units have significant improvements in regard to signal retrieval and data compression in order to reduce the size of the dedicated memory, the dedicated memory still occupies the majority of area of the trace generation unit. In this regard, the conventional processor often includes the trace generation unit only in the phases of designing and verification while omitting the trace generation unit in the phase of mass production in order to reduce the cost. However, this makes it difficult for the processor to debug when an abnormality occurs during the execution of programs.

As described above, it is difficult not only to debug the conventional processor due to the removal of the trace generation unit in the phase of mass production, but also to reduce the cost due to the arrangement of the dedicated memory in the trace generation unit. Thus, it is necessary to improve the conventional processor.

SUMMARY OF THE INVENTION

It is therefore the objective of this invention to provide a processor capable of storing trace data. The processor is able to store the trace data using the internal storage space thereof without having to employ a dedicate memory for storing said data.

It is another objective of this invention to provide a cache memory of the processor wherein the processor is able to store the trace data when executing programs.

It is a further objective of this invention to provide a control method of the processor wherein the processor is able to store the trace data when executing programs.

In an embodiment of the disclosure, a processor capable of storing trace data comprises a core adapted to execute programs, as well as a cache memory electrically connected to the core. The cache memory comprises a core way and a trace way. The core way is adapted to store data that is required when the core executes the programs. The trace way is adapted to store data that is generated during debugging operations of the core.

In a form shown, each of the core way and the trace way comprises a data memory, a tag memory and a write back address memory. The data memory of the core way is adapted to store the data that is required when the core executes the programs. The data memory of the trace way is adapted to store the data that is generated during the debugging operations of the core. The tag memory stores a plurality of states of row and a plurality of tags, and selects one of the plurality of states of row and one of the plurality of tags according to an address outputted by the core. The write back address memory is adapted to store a plurality of row addresses. The cache memory further comprises a data/trace cache control register, a line index calculator, a cache controller, a plurality of data/trace configuration units, a plurality of comparators, a plurality of trace protection units and a plurality of trace dump units. The data/trace cache control register is adapted to store a predetermined trace address and a plurality of cache way control bits. Each cache way control bit corresponds to a respective one of the data memories and comprises two state values. The line index calculator generates a trace address, a trace data and a trace enabling bit according to the plurality of cache way control bits, a valid trace bit and the data that is generated during the debugging operations of the core. The cache controller generates a core data, a core enabling bit and a cache way cleaning bit according to the address outputted by the core and the data that is required when the core executes the programs. The address comprises a set index and an address tag. Each data/trace configuration unit corresponds to a respective one of the plurality of cache way control bits. Each data/trace configuration unit controls the core data to be written into the data memory according to one of the two state values of the cache way control bit, the set index and the core enabling bit, or controls the trace data to be written into the data memory according to another one of the two state values of the cache way control bit, the trace address and the trace enabling bit. Each comparator compares the address tag with the tag outputted by the tag memory and generates a tag hit bit. Each trace protection unit generates a locking bit and a hit bit according to a corresponding one of the plurality of cache way control bits, the plurality of states of row outputted by the tag memory and the tag hit bit. Each trace dump unit generates a write-back address according to a corresponding one of the plurality of cache way control bits, the plurality of row addresses, the plurality of states of row and the predetermined trace address.

In the form shown, the data/trace cache control register is electrically connected to the line index calculator, the plurality of data/trace configuration units, the plurality of trace protection units and the plurality of trace dump units. The plurality of data/trace configuration units is electrically connected to the line index calculator, the cache controller and the data memories. The plurality of comparators is electrically connected to the plurality of trace protection units and the tag memories. The tag memories are electrically connected to the plurality of trace protection units and the plurality of trace dump units. The plurality of trace dump units is electrically connected to the write back address memories.

In the form shown, the cache memory further comprises a cache way selector, a first multiplexer and a second multiplexer. The cache way selector generates a trace selection bit according to the hit bit. The first multiplexer outputs data from the data memory of the core way or from the data memory of the trace way according to the trace selection bit. The second multiplexer outputs data from the data memory of the core way or from the data memory of the trace way according to the cache way cleaning bit.

In the form shown, the data/trace cache control register comprises an address register and a control register. The address register stores the predetermined trace address and is electrically connected to the plurality of trace dump units. The control register stores the plurality of cache way control bits and is connected to the line index calculator, the plurality of data/trace configuration units, the plurality of trace protection units and the plurality of trace dump units.

In the form shown, the line index calculator comprises a third multiplexer, a register, an adder, a fourth multiplexer, an address decoder, a comparator, a data writing controller, a fifth multiplexer and a bus. The third multiplexer is connected to the register, the adder and a trace valid port. The fourth multiplexer is connected to the third multiplexer, the register, the adder, the address decoder, the comparator and the data/trace cache control register. The data writing controller is connected to the address decoder, the comparator and the fifth multiplexer. The fifth multiplexer is connected to the trace valid port. The bus is connected to a trace data input port.

In the form shown, each of the plurality of data/trace configuration units comprises a first AND logical gate, a sixth multiplexer, a seventh multiplexer and an eight multiplexer. The first AND logical gate is connected to the data/trace cache control register and the line index calculator. The sixth multiplexer is connected to the first AND logical gate, the line index calculator and a core address input port. The seventh multiplexer is connected to the first AND logical gate, the line index calculator and the cache controller. The eight multiplexer is connected to the first AND logical gate, the line index calculator and the cache controller.

In the form shown, each of the plurality of trace protection units comprises a first OR logical gate, a NOT logical gate and a second AND logical gate. The first OR logical gate is electrically connected to the data/trace cache control register and the tag memory. The NOT logical gate is electrically connected to the data/trace cache control register. The second AND logical gate is electrically connected to the NOT logical gate and the comparator.

In the form shown, each of the plurality of trace dump units comprises a ninth multiplexer, a second OR logical gate and a third OR logical gate. The ninth multiplexer is connected to the data/trace cache control register and the write back address memory. The second OR logical gate and the third OR logical gate are electrically connected to the tag memory.

In the form shown, the cache memory further comprises a pipeline register electrically connected between the line index calculator and the plurality of data/trace configuration units.

In the form shown, the processor further comprises a trace generation unit electrically connected to the line index calculator of the cache memory.

In another embodiment of the disclosure, a cache memory of a processor capable of storing trace data is disclosed. The cache memory comprises a core way, a trace way, a data/trace cache control register, a line index calculator, a cache controller, a plurality of data/trace configuration units, a plurality of comparators, a plurality of trace protection units and a plurality of trace dump units. Each of the core way and the trace way comprises a data memory, a tag memory and a write back address memory. The data memories of the core way and the trace way are adapted to store data. The tag memory stores a plurality of states of row and a plurality of tags, and selects one of the plurality of states of row and one of the plurality of tags according to an address outputted by the core. The write back address memory is adapted to store a plurality of row addresses. The data/trace cache control register is adapted to store a predetermined trace address and a plurality of cache way control bits. Each cache way control bit corresponds to a respective one of the data memories and comprises two state values. The line index calculator generates a trace address, a trace data and a trace enabling bit according to the plurality of cache way control bits, a valid trace bit and the data that is generated during the debugging operations of the core. The cache controller generates a core data, a core enabling bit and a cache way cleaning bit according to the address outputted by the core and the data that is required when the core executes the programs. The address comprises a set index and an address tag. Each data/trace configuration unit corresponds to a respective one of the plurality of cache way control bits. Each data/trace configuration unit controls the core data to be written into the data memory according to one of the two state values of the cache way control bit, the set index and the core enabling bit, or controls the trace data to be written into the data memory according to another one of the two state values of the cache way control bit, the trace address and the trace enabling bit. Each comparator compares the address tag with the tag outputted by the tag memory and generates a tag hit bit. Each trace protection unit generates a locking bit and a hit bit according to a corresponding one of the plurality of cache way control bits, the plurality of states of row outputted by the tag memory and the tag hit bit. Each trace dump unit generates a write-back address according to a corresponding one of the plurality of cache way control bits, the plurality of row addresses, the plurality of states of row and the predetermined trace address.

In a further embodiment of the disclosure, a control method of a processor capable of storing trace data is disclosed. The processor comprises a core and a cache memory. The cache memory comprises a data/trace cache control register, a line index calculator, a cache controller, a plurality of data/trace configuration units, a plurality of comparators, a plurality of trace protection units, a plurality of trace dump units, a plurality of data memories, a plurality of tag memories and a plurality of write back address memories. The data/trace cache control register is electrically connected to the line index calculator, the plurality of data/trace configuration units, the plurality of trace protection units and the plurality of trace dump units. The plurality of data/trace configuration units is electrically connected to the line index calculator, the cache controller and the data memories. The plurality of comparators is electrically connected to the plurality of trace protection units and the plurality of tag memories. The plurality of tag memories is electrically connected to the plurality of trace protection units and the plurality of trace dump units. The plurality of trace dump units is electrically connected to the plurality of write back address memories. The control method comprises setting the data/trace cache control register by the core to operate one of the plurality of data memories, one of the plurality of tag memories and one of the plurality of write back address memories as one trace way. The control method further comprises testing the core by a trace generation unit and retrieving an output signal of the core as a trace data, generating a storage address of the trace data by a line index calculator, writing the trace data into the data memory of the trace way according to the storage address by one of the plurality of data/trace configuration units, determining whether the data memory of the trace way is full by the data/trace configuration unit. The control method further comprises updating the storage address by the line index calculator if the data memory of the trace way is not full, thereby allowing the data memory of the trace way to store a further trace data, or prohibiting the trace data from being written into the data memory of the trace way by the line index calculator if the data memory of the trace way is full. The control method further comprises outputting the trace data stored in the data memory of the trace way and cleaning the data memory of the trace way by the core.

In a form shown, the control method of the processor further comprises executing an instruction by the core to clean the data stored in any line address of the data memory after the testing of the trace generation unit is finished, determining whether the line address is located in the data memory of the trace way by the cache controller, writing the data of the line address into a corresponding memory address of a chip input/output interface and repeatedly performing the determining step of the cache controller until the data of the data memory of the trace way is completely written into the corresponding memory address of the chip input/output interface, and writing the data of the line address into a corresponding address of an external memory.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
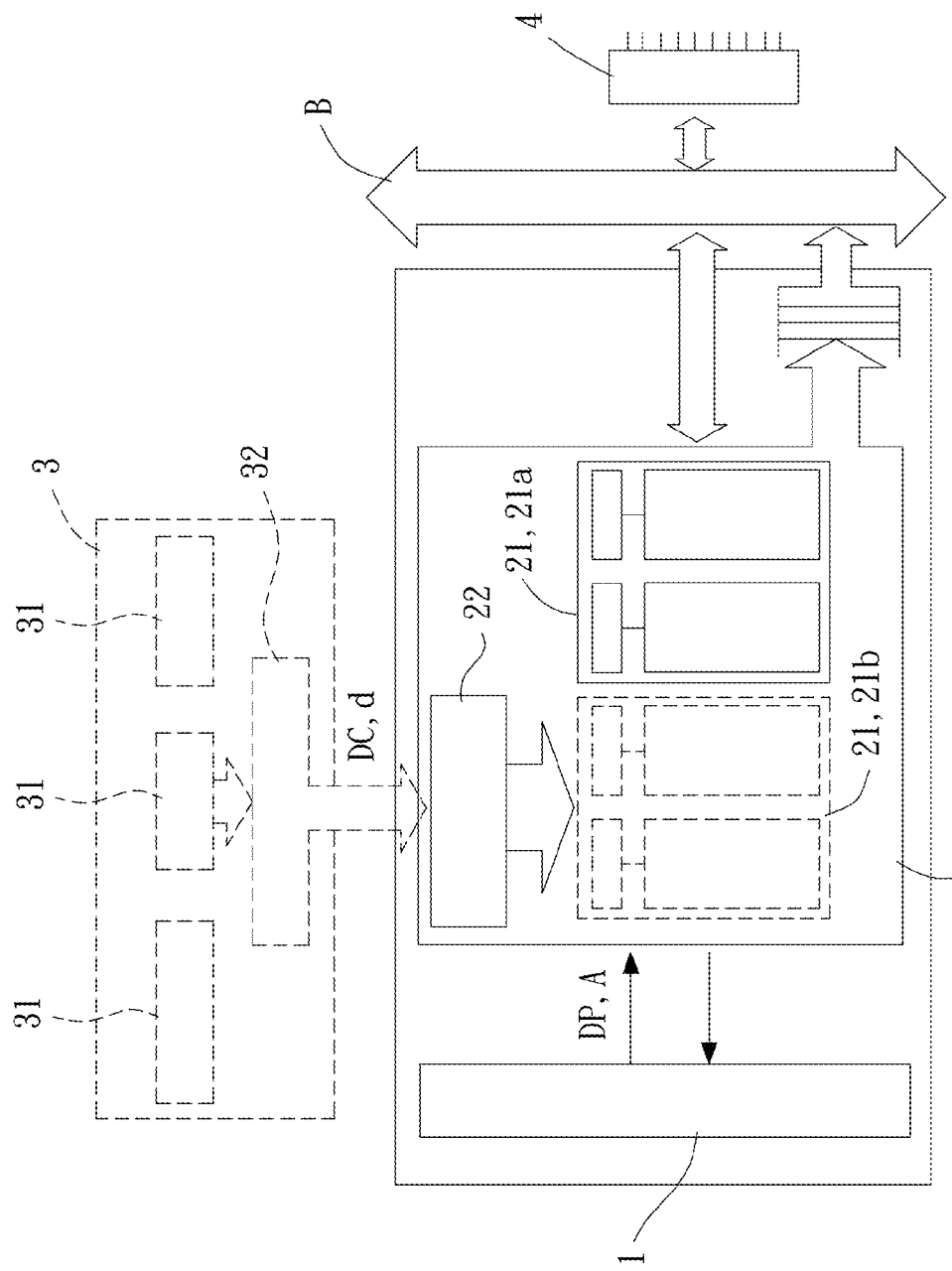
FIG. 1 shows a configuration of a processor capable of storing trace data according to an embodiment of the disclosure.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

FIG. 1 shows a configuration of a processor capable of storing trace data according to an embodiment of the disclosure. The processor includes a core 1 and a cache memory 2. The core 1 is used to execute programs (i.e. various commands) and may be debugged by a trace generation unit 3. The trace generation unit 3 can be arranged inside core 1 (On-chip) or outside core 1 (Off-chip). The cache memory 2 is electrically connected to core 1 and includes a plurality of cache ways 21. The plurality of cache ways 21 includes at least one core way 21a and at least one trace way 21b. The core way 21a is used to store the data that is required when core 1 executes programs, such as the frequently-used data retrieved from the main memory. The trace way 21b may store the data via a data/trace (D/T) cache control register 22 that is generated by the debugging operations of core 1. The cache memory 2 may be further connected to a chip input/output (I/O) interface 4 via a bus "B", so that the data of cache memory 2 may be transferred to and stored in an external memory (such as main memory). In the above, each of the processor, the core 1 and the cache memory 2 may be in the form of SIP (Silicon Intelligent Property). In addition, the processor may also be in the form of an IC (integrated circuit). In this embodiment, the plurality of cache ways 21 includes one core way 21a and one trace way 21b (namely, two cache ways 21 in total). The trace generation unit 3 is arranged in the processor (not shown) and includes a plurality of trace generators 31. The trace generation unit 3 may further include a trace compressor 32 electrically connected to the plurality of trace generators 31 and the D/T cache control register 22. The trace compressor 32 compresses the signals that are sent from trace generators 31 to D/T cache control register 22, but is not limited thereto.

Figure 2:
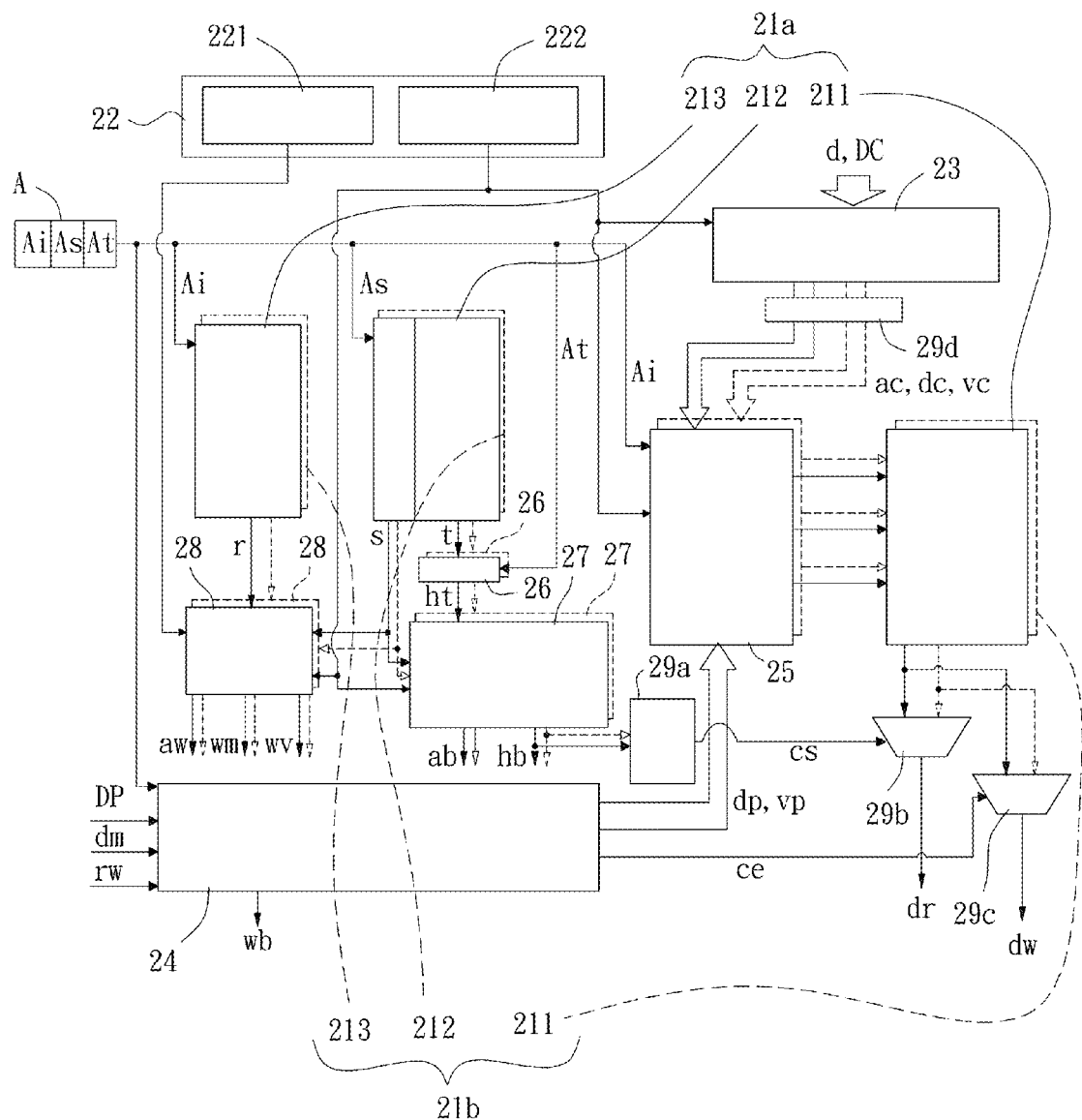
FIG. 2 shows a configuration of a cache memory of the processor according to the embodiment of the disclosure.

FIG. 2 shows a configuration of cache memory 2 of the processor according to the embodiment of the disclosure. Both the core way 21a and the trace way 21b include a data memory 211, a tag memory 212 and a write back (WB) address memory 213. The data memories 211 are used to store the aforementioned data. The tag memories 212 are used to store a plurality of states of row "s" and a plurality of tags "t." One of the plurality of states of row "s" and one of the plurality of tags "t" are selected according to an address "A" outputted by core 1. The WB address memories 213 are used to store a plurality of row addresses "r."

Referring to FIG. 2 again, cache memory 2 further includes a data/trace (D/T) cache control register 22, a line index calculator 23, a cache controller 24, a plurality of data/trace (D/T) configuration units 25, a plurality of comparators 26, a plurality of trace protection units 27 and a plurality of trace dump units 28. The D/T cache control register 22 is used to temporarily store a predetermined trace address "a" and a plurality of cache way control bits "c." Each cache way control bit "c" corresponds to the data of a respective data memory 211 and includes two state values (such as 0 or 1). The line index calculator 23 generates a trace address "ac", a trace data "dc" (that is to be stored somewhere in a later stage) and a trace enabling bit "vc" according to the plurality of cache way control bits "c", a valid trace bit "d" as well as the data "DC" generated by the debugging operations of core 1. The cache controller 24 generates a core data "dp" (that is to be stored somewhere in a later stage), a core enabling bit "vp" and a cache way cleaning bit "ce" according to the address "A" and the data that is required when core 1 executes programs. The address "A" includes a set index "Ai", a byte offset "As" and an address tag "At." An external memory data "dm" and a read/write (RW) control signal "rw" may be written into cache controller 24. Furthermore, cache controller 24 may also output a write-back address "wb" to a write back buffer (not shown). The plurality of D/T configuration unit 25 controls core data "dp" to be written into the corresponding data memory 211 according to one of the state values of the cache way control bit "c" of the data memory 211, the set index "Ai" and the core enabling bit "vp", or controls trace data "dc" to be written into the corresponding data memory 211 according to another one of the state values of the cache way control bit "c" of the data memory 211, the trace address "ac", and the trace enabling bit "vc." Specifically, assume the cache way control bit "c" has two bits as represented by c[1:2]. In this regard, when c[1]=0, it indicates core enabling bit "vp" can be written into an address of data memory 211 of core way 21a corresponding to set index "Ai" based on core enabling bit "vp." To the contrary, when c[1]=1, it indicates core enabling bit "vp" cannot be written into said address. Similarly, when c[2]=1, it indicates trace data "dc" can be written into an address of data memory 211 of trace way 21b corresponding to set index "Ai" based on trace enabling bit "vc." To the contrary, when c[2]=0, it indicates trace data "dc" cannot be written into said address.

Each comparator 26 compares address tag "At" with the tag "t" outputted by the corresponding tag memory 212 and generates a tag hit bit "ht." Each trace protection unit 27 generates a locking bit "ab" and a hit bit "hb" according to the cache way control bit "c", the plurality of states of row "s" outputted by tag memory 212 and the tag hit bit "ht." Each trace dump unit 28 generates a write-back address "aw", a modification bit "wm" and a valid bit "wv" according to the cache way control bit "c", the plurality of row address "r", the plurality of states of row "s" and the predetermined trace address "a." The cache memory 2 may further comprise a cache way selector 29a, a first multiplexer 29b and a second multiplexer 29c. The cache way selector 29a generates a trace selection bit "cs" according to hit bit "hb." The first multiplexer 29b outputs the data from data memory 211 of core way 21a or from data memory 211 of trace way 21b according to trace selection bit "cs." The outputted data is represented as a retrieved data "dr" and sent to core 1. The second multiplexer 29c outputs the data from data memory 211 of core way 21a or from data memory 211 of trace way 21b according to cache way cleaning bit "ce." The outputted data of second multiplexer 29c is represented as a write-back data "dw" and sent to the write buffer. Moreover, the cache memory 2 may further include a pipeline register 29d electrically connected between the line index calculator 23 and the plurality of D/T configuration units 25, so that the data can be transferred from the line index calculator 23 to the plurality of D/T configuration units 25 via one or more pipelines for improved data processing efficiency. The pipeline register 29d is not described herein as it can be readily appreciated by one skilled in the art.

In this embodiment, the D/T cache control register 22 is electrically connected to the line index calculator 23, the plurality of D/T configuration units 25, the plurality of trace protection units 27 and the plurality of trace dump units 28. The plurality of D/T configuration units 25 is electrically connected to line index calculator 23, cache controller 24 and data memories 211. The plurality of comparators 26 is electrically connected to the plurality of trace protection units 27 and the tag memories 212. The tag memories 212 are electrically connected to the plurality of trace protection units 27 and the plurality of trace dump units 28. The plurality of trace dump units 28 is electrically connected to WB address memories 213. However, the connections among the components are not limited to the above.

To access the memories inside cache memory 2, address "A" preferably includes set index "Ai", byte offset "As" and address tag "At." The set index "Ai" is sent to all data memories 211, tag memories 212 and WB address memories 213 in order to retrieve the corresponding cache line data, the cache line tag, the cache line state and the cache line write-back address from each cache way 21 (i.e. core way 21a or trace way 21b) as indicated by set index "Ai." Each comparator 26 compares the cache line tag outputted by the cache way 21 with address tag "At" outputted by core 1. The compared result of each cache way 21 is sent to cache controller 24 and cache way selector 29a in order to determine whether there is a consistent comparison in any cache way 21. If the comparison is consistent, it indicates the required data of core 1 is stored in cache memory 2, which is the case of "cache hit." In this regard, the required data can be acquired from the cache way 21 having the cache hit. Thus, cache way selector 29a generates a control signal that controls first multiplexer 29b to select the cache line data outputted by the cache way 21 having the cache hit. The outputted data of first multiplexer 29b serves as the retrieved data "dr" to be sent to core 1. To the contrary, if there is no consistent comparison in each cache ways 21, it indicates the required data of core 1 is not yet loaded into cache memory 2, which is the case of "cache miss." At this point, cache controller 24 reads data from the external memory and loads the data into cache memory 2. In order to make a room to store the data retrieved from the external memory, based on the locking bit of the cache line state outputted by each cache way 21, cache controller 24 performs a replacement policy that records information in set index "Ai" indicating which cache way 21 can be updated. In this case, if the modification bit in the cache line state of the updatable cache way 21 is denoted as "modified" (such as 1), the modified cache line data must be transferred to the external memory. At this time, cache controller 24 generates and sends the cache way cleaning bit "ce" to second multiplexer 29c. Then, second multiplexer 29c outputs the cache line data of the selected cache way 21 as the write-back data and sends the data to the write buffer. Meanwhile, cache controller 24 determines an address where the data is to be written back according to the updated cache way 21. The address serves as the write-back address "wb" and is sent to the write buffer. Thus, the data retrieved from the external memory can be moved back to a cache line of the data memory 211 of the updated cache way 21 corresponding to set index "Ai." Also, the address tag and write-back address corresponding to the cache line data is moved to an address in the tag memory 212 of the updated cache way 21 corresponding to the set index "Ai." Finally, when core 1 is idle, the cache line data in the write buffer is accordingly written into corresponding addresses of the external memory.

Referring to FIG. 2 again, the D/T cache control register 22 may comprise an address register 221 and a control register 222. The address register 221 stores predetermined trace address "a" and is electrically connected to the plurality of trace dump units 28. The control register 222 stores the plurality of cache way control bit "c" and is connected to the line index calculator 23, the plurality of D/T configuration units 25, the plurality of trace protection units 27 and the plurality of trace dump units 28. Specifically, the address register 221 is used to set the memory address of chip I/O interface 4 so that the trace data stored in cache memory 2 can be transferred in a conventional write back manner to a host end running the trace software outside the chip. In this manner, further analysis is achieved. Besides, in order to reconfigure the storage room of cache memory 2 into a storage space for the data "DC", the control register 222 is used to set the attribute of each cache way 21. Thus, each cache way 21 is provided with a corresponding bit. For example, when either bit is set as "1", it indicates the cache way 21 corresponding to the bit is set as (or reconfigured into) the storage space for the data "DC." In this situation, only the trace generation unit 3 is allowed to write data into the cache way 21. When the bit is set as "0", it indicates the cache way 21 corresponding to the bit remains its original data accessibility. In this situation, only the core 1 is allowed to write the data that is required when executing programs into the cache way 21.

Figure 3:
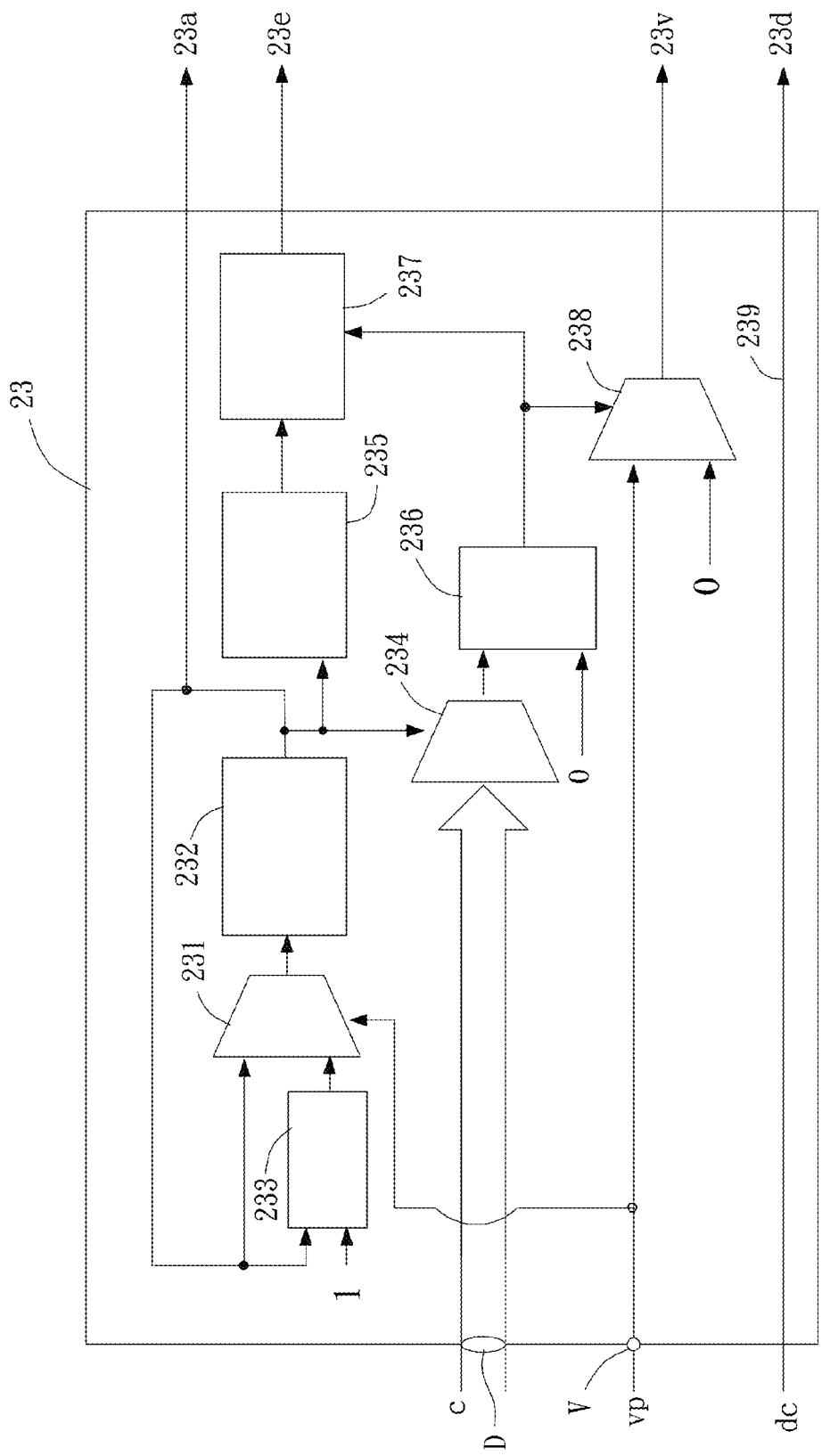
FIG. 3 shows a detailed configuration of a line index calculator of the processor according to the embodiment of the disclosure.

FIG. 3 shows a detailed configuration of the line index calculator of the processor according to the embodiment of the disclosure. Please also refer to FIG. 2, line index calculator 23 is used to generate an address where the data "DC" is written into the data memory 211 of trace way 21b of cache memory 2 (which is the corresponding cache line of set index "Ai"). In the embodiment, line index calculator 23 includes a third multiplexer 231, a register 232, an adder 233, a fourth multiplexer 234, an address decoder 235, a comparator 236, a data writing controller 237, a fifth multiplexer 238 and a bus 239. The third multiplexer 231 is connected to register 232, adder 233 and a trace valid port "V" (which is designed to receive trace enabling bit "vc"). The fourth multiplexer 234 is connected to third multiplexer 231, register 232, adder 233, address decoder 235, comparator 236 and control register 222 of D/T cache control register 22. The data writing controller 237 is connected to address decoder 235, comparator 236 and fifth multiplexer 238. The fifth multiplexer 238 is connected to the trace valid port "V." The bus 239 is connected to a trace data input port "D" (which is used to receive trace data "dc"). The line index calculator 23 further includes four output ports respectively outputting a trace write address 23a, a trace write selection signal 23e, a trace write active signal 23v and a trace write data 23d. Specifically, when trace enabling bit "vc" (such as "1") is received, adder 233 may update the trace address "ac" stored in register 232 by increasing the value of trace address "ac" by 1. The fourth multiplexer 234 may choose a corresponding cache way control bit "c" based on the MSB of trace address "ac." Based on trace address "ac", the address decoder 235 may generate an enabling signal that is required when data is to be written into data memory 211, so that only one data memory 211 can be written at a single time. For instance, if the trace address "ac" is represented by 9 bits, the MSB of the trace address "ac" can serve as the enabling signal. When the enabling signal is "1", it indicates data memory 211 of trace way 21b can be written. When the enabling signal is "0", it indicates data memory 211 of trace way 21b is full and cannot be written. The comparator 236 compares a corresponding bit of control register 222 (selected by fourth multiplexer 234) with "0" to see if the bit is false (such as "0"). If the bit is "0", it indicates the writing address of data "DC is no longer in the data memory 211 of trace way 21b (namely, is no longer in a trace information area). In this regard, comparator 236 sends a control signal indicating whether the trace information area is full to data writing controller 237 and fifth multiplexer 238. One input of data writing controller 237 is the enabling signal of data memory 211 of the cache way 21. Another input of data writing controller 237 is the control signal of comparator 236 indicating whether the trace information area is full. When the control signal of comparator 236 is true (the trace information area is full), the enabling signal of data memory 211 of each cache way 21 outputted by address decoder 235 is forcibly set as false and then sent to the plurality of D/T configuration units 25 to prevent the writing operation of trace data "dc." The fifth multiplexer 238 is used to generate and send trace write active signal 23v to the plurality of D/T configuration units 25.

Figure 4:
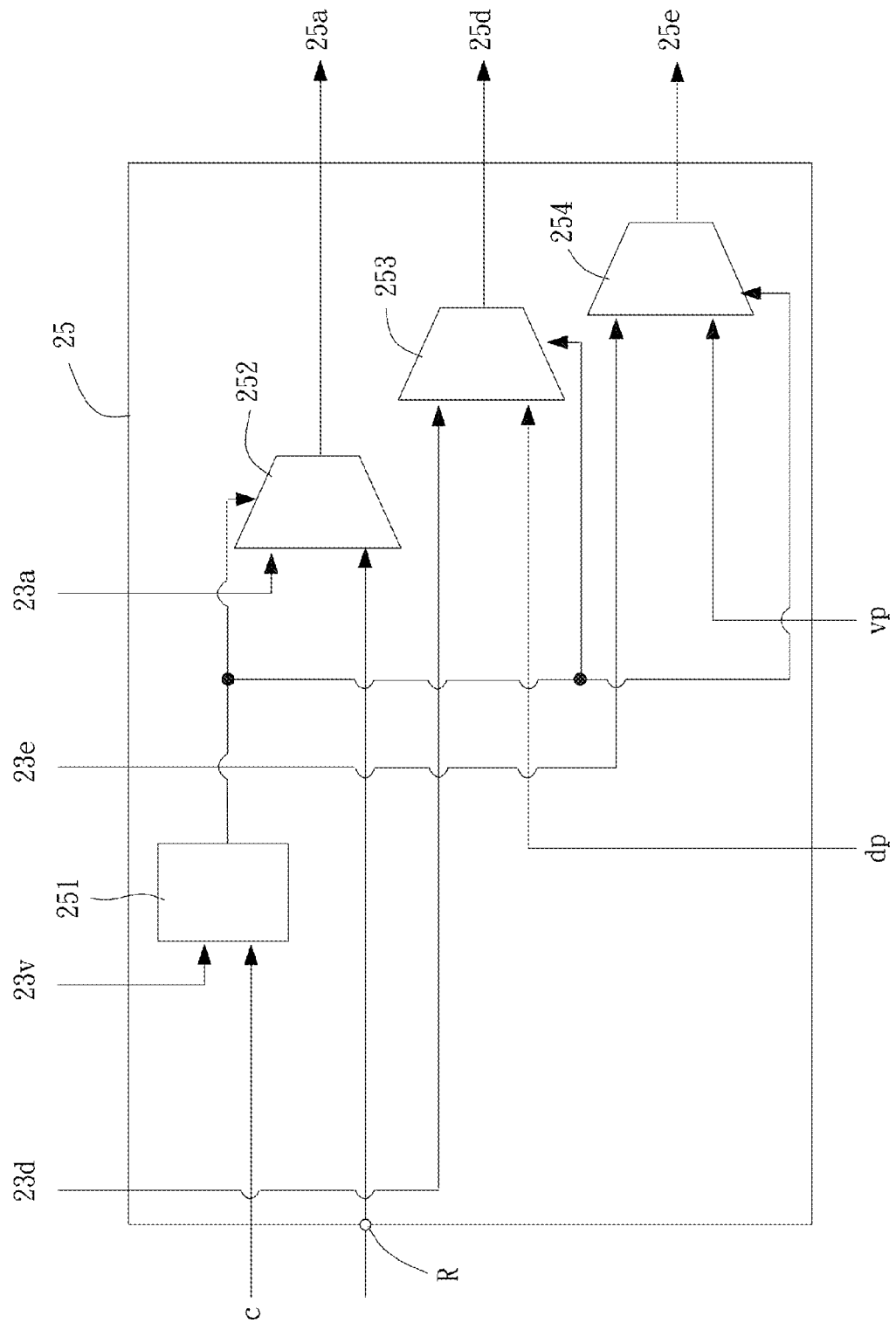
FIG. 4 shows a detailed configuration of a D/T configuration unit of the processor according to the embodiment of the disclosure.

FIG. 4 shows a detailed configuration of the D/T configuration unit of the processor according to the embodiment of the disclosure. The D/T configuration unit 25 includes a first AND logical gate 251, a sixth multiplexer 252, a seventh multiplexer 253 and an eight multiplexer 254. The first AND logical gate 251 is connected to the control register 222 of D/T cache control register 22 (for receiving cache way control bit "c") and line index calculator 23 (for receiving trace write address 23a, trace write selection signal 23e, trace write active signal 23v and trace write data 23d). The sixth multiplexer 252 is connected to first AND logical gate 251, line index calculator 23 and a core address input port "R" (for receiving set index "Ai"). The seventh multiplexer 253 is connected to first AND logical gate 251, line index calculator 23 and cache controller 24 (for receiving core data "dp"). The eight multiplexer 254 is connected to first AND logical gate 251, line index calculator 23 and cache controller 24 (for receiving core enabling bit "vp"). The D/T configuration unit 25 further includes three output ports for respectively outputting a source address 25a, a source data 25d and a source enabling signal 25e. Specifically, the D/T configuration unit 25 determines the source data of data memory 211 is from trace generation unit 3 or core 1. When data is to be written into data memory 211, it is required to specify the address, the data to be written (source data), and the source enabling signal. Therefore, based on the setting of control register 222, the D/T configuration unit 25 determines which of line index calculator 23 and cache controller 24 provides the source data, the source enabling signal, and the address of data memory 211.

Figure 5:
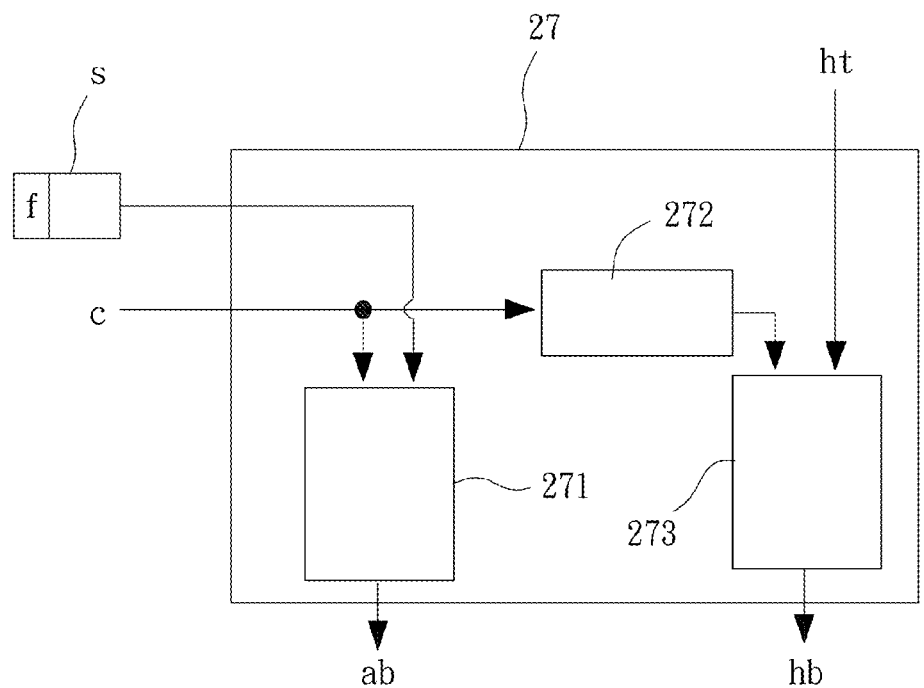
FIG. 5 shows a detailed configuration of a trace protection unit of the processor according to the embodiment of the disclosure.

FIG. 5 shows a detailed configuration of the trace protection unit of the processor according to the embodiment of the disclosure. The trace protection unit 27 is used to prevent the trace data stored in cache memory 2 from being overwritten due to core 1 accessing cache memory 2. When core 1 reads data, trace protection unit 27 protects the trace data via the locking bit of the cache line state outputted by the cache way 21. Specifically, in the case of cache miss, the cache replacement policy in cache controller 24 will not choose trace way 21b for update purposes. When core 1 writes data, trace protection unit 27 prevents the "cache hit" from happening in trace way 21b via the tag comparison result of cache way 21, thereby preventing the data in trace way 21b from being overwritten by the written data of core 1. In the embodiment, trace protection unit 27 includes a first OR logical gate 271, a NOT logical gate 272 and a second AND logical gate 273. The first OR logical gate 271 is electrically connected to the control register 222 of D/T cache control register 22 and the tag memory 212 for respectively receiving a locking bit "f" in the plurality of states of row "s" and receiving hit bit "hb." The NOT logical gate 272 is electrically connected to the control register 222 of D/T cache control register 22 for receiving the plurality of cache way control bit "c." The second AND logical gate 273 is electrically connected to the NOT logical gate 272 and the comparator 26 for receiving tag hit bit "ht." The trace protection unit 27 further includes two output ports for receiving locking bit "ab" and hit bit "hb", respectively.

Figure 6:
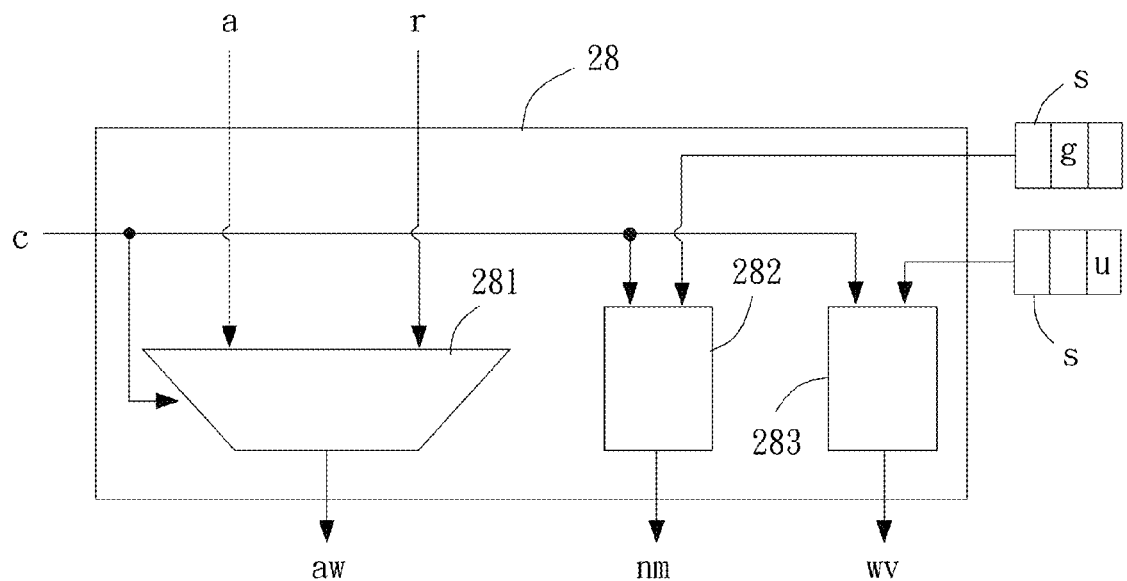
FIG. 6 shows a detailed configuration of a trace dump unit of the processor according to the embodiment of the disclosure.

FIG. 6 shows a detailed configuration of the trace dump unit of the processor according to the embodiment of the disclosure. The trace dump unit 28 is used to transfer the data stored in trace way 21b in a conventional write back manner to a host end running the trace software outside the chip. When core 1 is about to run instructions for cleaning cache lines, based on the cache line write-back address as well as the modification bits and the valid bits in the cache line states, the trace dump unit 28 controls trace way 21b to move its data to a predetermined write back address rather than the external memory. In the embodiment, trace dump unit 28 includes a ninth multiplexer 281, a second OR logical gate 282 and a third OR logical gate 283. The ninth multiplexer 281 is connected to the control register 222 of D/T cache control register 22 (for receiving the plurality of cache way control bit "c" and the predetermined trace address "a") and WB address memory 213 (for receiving the plurality of row addresses "r"). The second OR logical gate 282 and the third OR logical gate 283 are electrically connected to tag memory 212 for receiving a modification bit "g" and a valid bit "u" contained in the plurality of states of row "s"). The trace dump unit 28 further includes three output ports for receiving write-back address "aw", modification bit "wm" and valid bit "wv", respectively.

Figure 7:
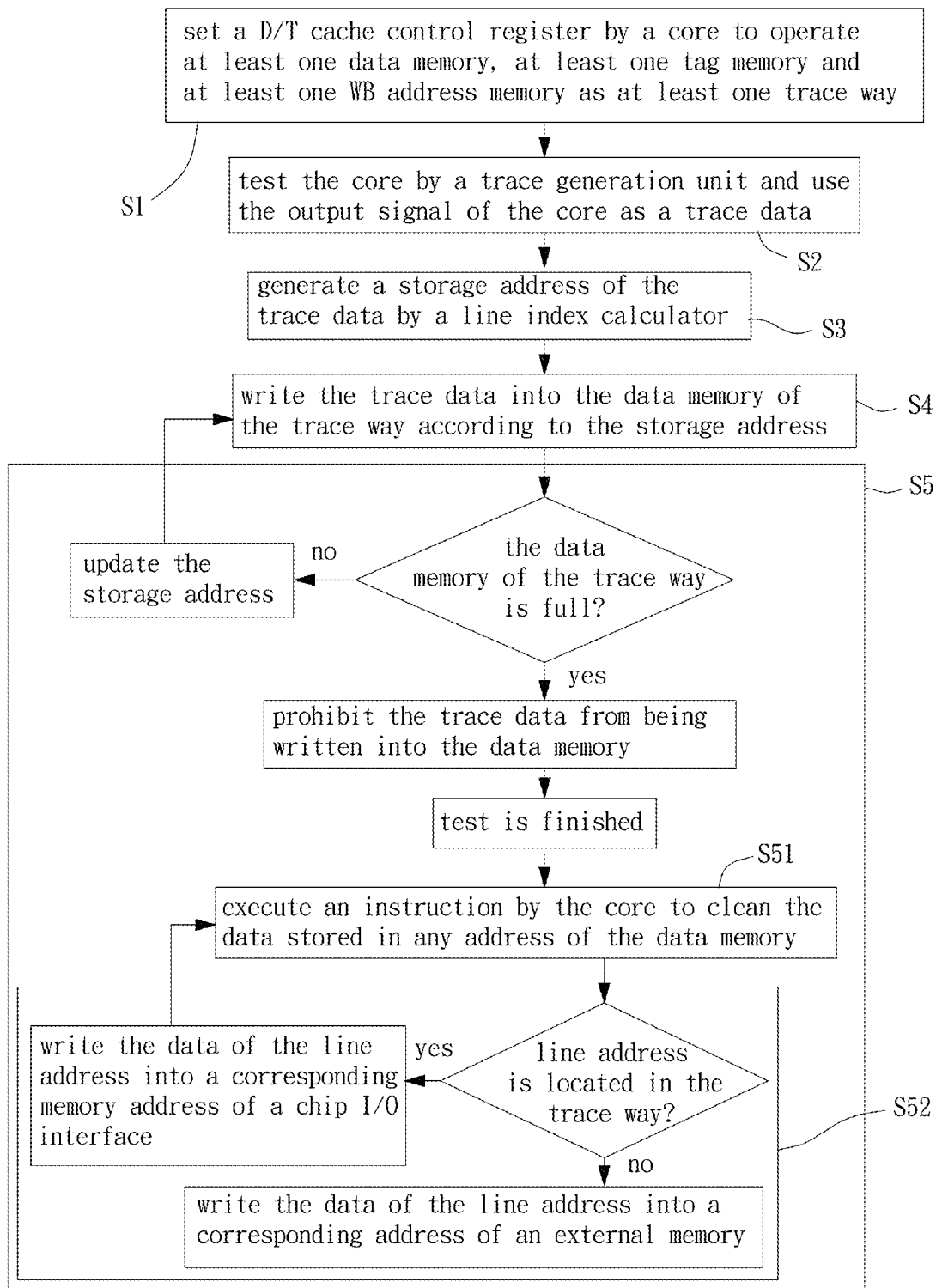
FIG. 7 shows a flowchart of a control method of the processor according to the embodiment of the disclosure.

FIG. 7 shows a flowchart of a control method of the processor according to the embodiment of the disclosure. The method comprises a step S1, a step S2, a step S3, a step S4 and a step S5. In step S1, core 1 sets D/T cache control register 22 to operate at least one data memory 211, at least one tag memory 212 and at least one WB address memory 213 as at least one trace way 21b. In step S2, trace generation unit 3 tests core 1 and uses the output signal of core 1 as a trace data (namely, the data "DC" generated by the debugging operations of core 1). In step S3, line index calculator 23 generates a storage address of trace data "DC" (i.e. the trace address "ac"). In step S4, D/T configuration unit 25 writes trace data "DC" into data memory 211 of trace way 21b according to the storage address. In step S5, line index calculator 23 determines whether data memory 211 of trace way 21b is full. If data memory 211 of trace way 21b is not full, line index calculator 23 updates storage address so that data memory 211 of trace way 21b can store another trace data. If data memory 211 of trace way 21b is full, line index calculator 23 prohibits the trace data from writing into data memory 211 of trace way 21b. After trace generation unit 3 finishes the test, the trace data stored in data memory 211 of trace way 21b is outputted and then core 1 cleans the data memory 211 of trace way 21b. Furthermore, a step S51 and a step S52 can be performed after trace generation unit 3 finishes the test. In step S51, core 1 executes an instruction (such as an instruction of a cleaning operation) for cleaning the data stored in any address of data memory 211. In step S52, cache controller 24 determines whether the address is located in the data memory of the trace way. If the determined result is positive, the data of the address is written into a corresponding memory address of chip I/O interface 4. The step S52 is repeatedly performed until the data of data memory 211 of trace way 21b is completely written into the corresponding memory address of chip I/O interface 4. If the determined result is negative (the address is not located in the data memory of the trace way), the data of the address is written into a corresponding address of the external memory.

Figure 8:
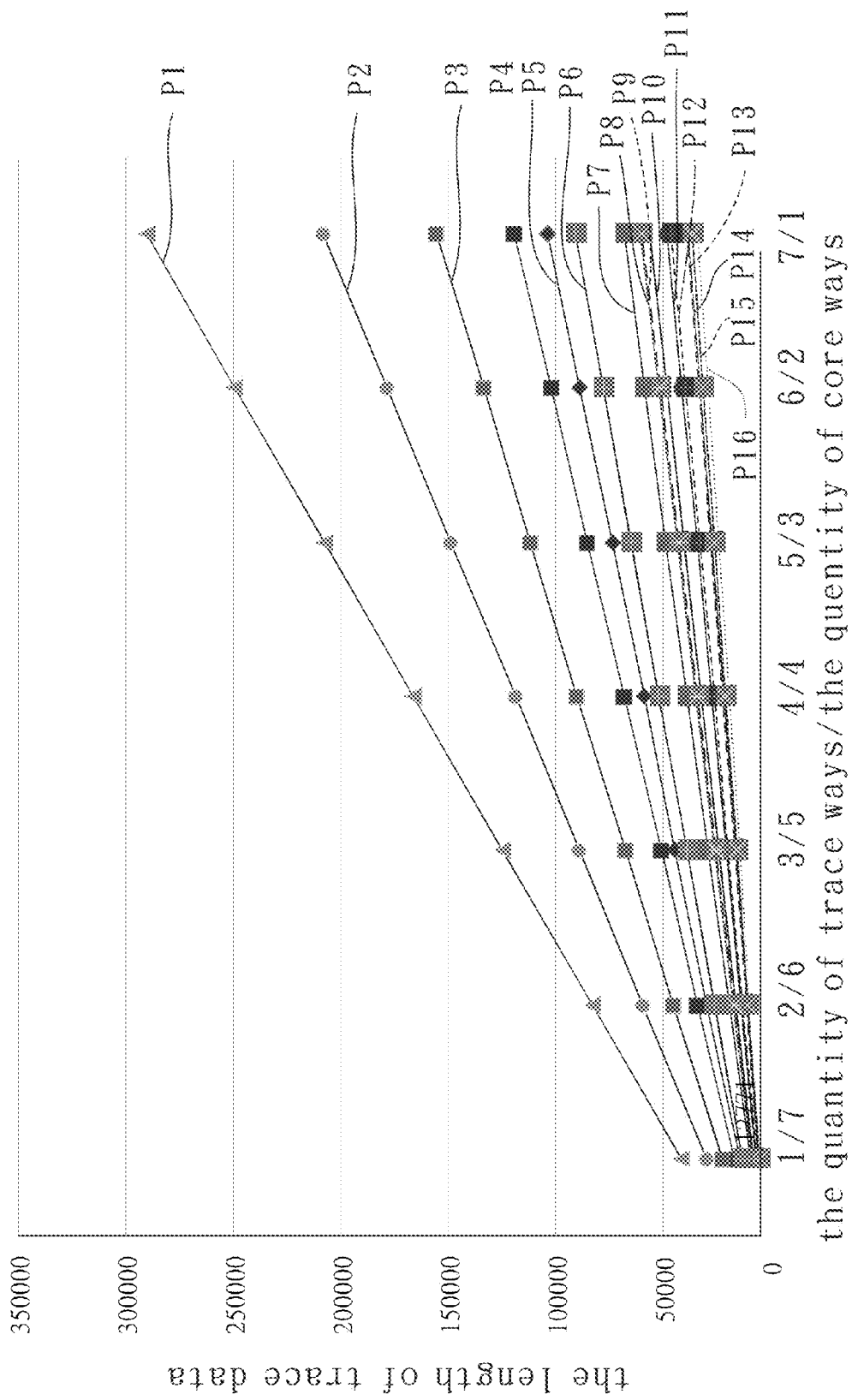
FIG. 8 shows a relation chart of the quantity of cache ways versus the allowed length of the trace data of the processor according to the embodiment of the invention.
Figure 9:
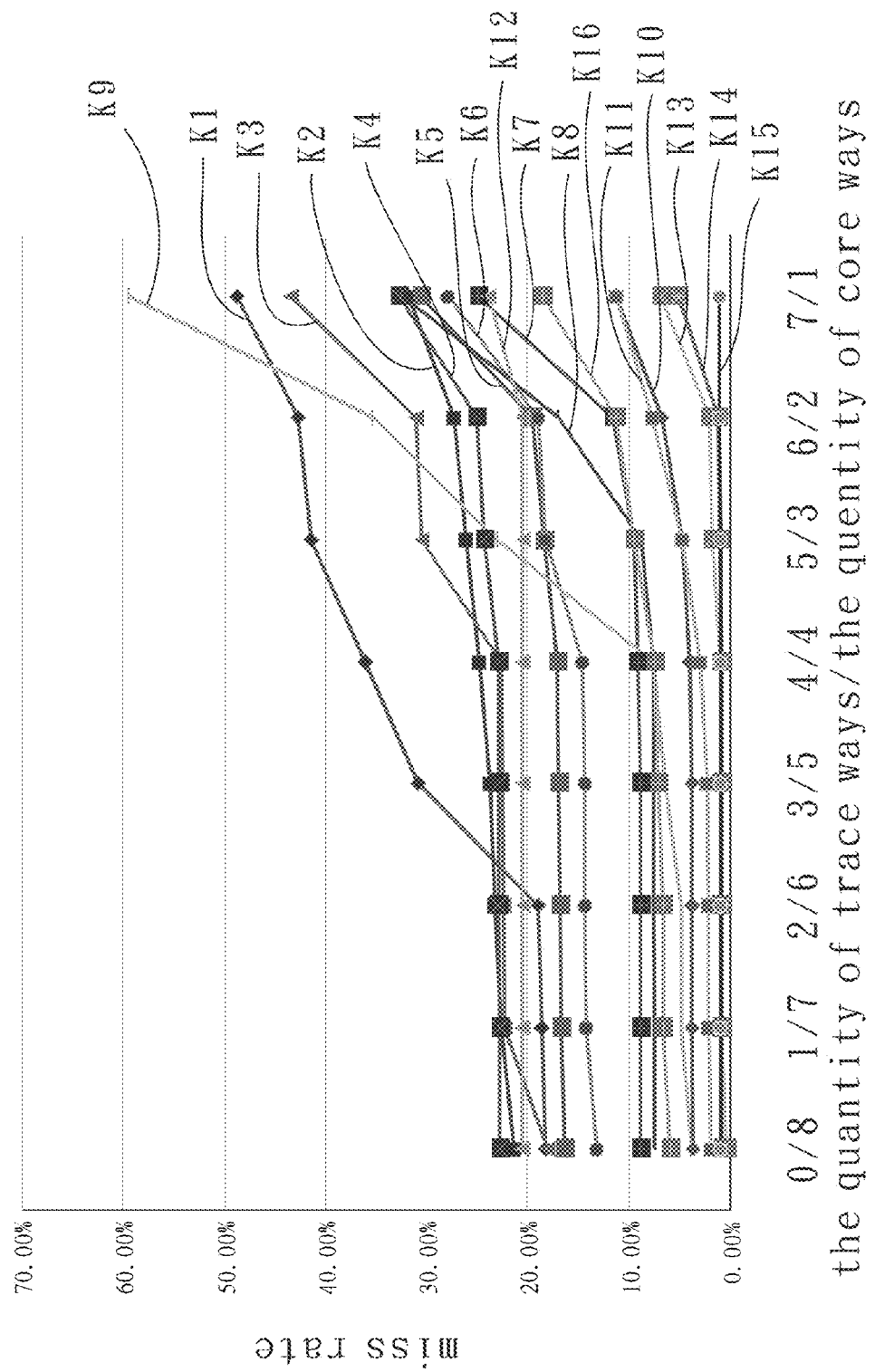
FIG. 9 shows a relation chart of the quantity of cache ways versus the miss rate according to the embodiment of the invention.

FIG. 8 shows a relation chart of the quantity of cache ways versus the allowed length of trace data of the processor according to the embodiment of the invention. For example, if the total number of the core ways and trace ways is 8, the horizontal axis represents the quantities of the core ways and trace ways and the longitudinal axis represents the allowed length of the trace data. The test results are denoted as P1 to P15 representative of various test solutions of djpeg, cjpeg, typeset, stringsearch, basicmath, ispell, qsort, FFT, patricia, bitcount, sha, ADPCM enc., dijkstra, susan, ADPCM dec. P16 represents the average value of P1 to P15. From FIG. 8, it can be obtained that the allowed length of trace data is proportional to the quantity of trace ways. In a case when the trace ways have a small quantity (such as one trace way only), the trace data with approximately 12771 clocks in average can be stored. This length is sufficient for testing the internal operational conditions of the chip and for easy debugging purposes.

FIG. 8 shows a relation chart of the quantity of cache ways versus the miss rate of the processor according to the embodiment of the invention. For example, if the total number of the core ways and trace ways is 8, the horizontal axis represents the quantities of the core ways and trace ways and the longitudinal axis represents the miss rate. The test results are denoted as K1 to K15 representative of various test solutions of djpeg, cjpeg, typeset, stringsearch, basicmath, ispell, qsort, FFT, patricia, bitcount, sha, ADPCM enc., dijkstra, susan, ADPCM dec. K16 represents the average value of K1 to K15. From FIG. 8, it can be obtained that the entire miss rate does not increase by much as the quantity of the trace ways increases. Although the percentage of the trace ways is as high as 50% of the total cache ways, the miss rate increases only by 1.53%. Thus, the proposed method of the disclosure does provide the user with improved utility and allows the trace data to have a sufficient length by slightly increasing the miss rate. Advantageously, the operational conditions inside the chip can be analyzed.

Based on the technical features described above, the processor, the cache memory of the processor and the control method of the processor have the following advantages. Specifically, based on the elements (such as the data memory of the cache memory embedded in the processor and the cache controller) and the operations thereof, the associated information generated during the debugging phase can be stored. To enable the core of the processor and the trace generation unit to share the storage space of the cache memory, only a slight modification of the configuration of the conventional cache memory is required. In this arrangement, although the core of the processor does not have a high demand on the cache memory, the rest of available cache space can be flexibly used. Thus, efficient utilization of the cache resource can be achieved without wasting the limited cache resource inside the chip.

Besides, the storage space of the cache memory is shared between the core of the processor and other devices that are in need (such as the trace generation unit). Therefore, the storage space of the cache memory is not used by the core only. Furthermore, the difference between the disclosure and prior art technique is that the processor and the cache memory (or control method) of the disclosure, before accessing the cache memory, do not need to determine whether the address is located in the original segment of the cache memory or in another segment that has been reconfigured as a fast storage area. Thus, the processor and the cache memory (or control method) of the disclosure do not require additional determination circuit and do not increase the access time of the cache memory.

When the trace generation unit retrieves, compresses and writes the trace date into the data memory of the cache memory, the core of the processor can still access the cache memory as usual without affecting the behavior of the processor. Moreover, the stored trace data can be protected via the lock-down mechanism of the conventional cache controller, preventing the trace data from being overwritten by the core of the processor without having to largely modifying the hardware configuration of the cache memory. Furthermore, a part of storage space of the cache memory is reconfigured as a data storage space of the trace ways (for storing trace information), and the data storage space can be used directly without requiring any initialization procedure or pre-processing.

Furthermore, the processor of the disclosure is able to omit the dedicated memory that occupies the majority space inside the trace generation unit of the conventional processor. The processor of the disclosure is able to store trace data using the internal storage space thereof while executing programs, thereby reducing the cost and providing the desired debugging function.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A processor capable of storing trace data, comprising:
a core adapted to execute programs; and
a cache memory electrically connected to the core and comprising a core way and a trace way, wherein the core way is adapted to store data that is required when the core executes the programs, and wherein the trace way is adapted to store data that is generated during debugging operations of the core,
wherein each of the core way and the trace way comprises a data memory, a tag memory and a write back address memory, wherein the data memory of the core way is adapted to store the data that is required when the core executes the programs, wherein the data memory of the trace way is adapted to store the data that is generated during the debugging operations of the core, wherein the tag memory stores a plurality of states of row and a plurality of tags, and selects one of the plurality of states of row and one of the plurality of tags according to an address outputted by the core, wherein the write back address memory is adapted to store a plurality of row addresses, wherein the cache memory further comprises:
a data/trace cache control register adapted to store a predetermined trace address and a plurality of cache way control bits, wherein each of the plurality of cache way control bits corresponds to a respective one of the data memories and comprises two state values;
a line index calculator generating a trace address, a trace data and a trace enabling bit according to the plurality of cache way control bits, a valid trace bit and the data that is generated during the debugging operations of the core;
a cache controller generating a core data, a core enabling bit and a cache way cleaning bit according to the address outputted by the core and the data that is required when the core executes the programs, wherein the address comprises a set index and an address tag;
a plurality of data/trace configuration units, each corresponding to a respective one of the plurality of cache way control bits, wherein each of the plurality of data/trace configuration units controls the core data to be written into the data memory according to one of the two state values of the cache way control bit, the set index and the core enabling bit, or controls the trace data to be written into the data memory according to another one of the two state values of the cache way control bit, the trace address and the trace enabling bit;
a plurality of comparators, each comparing the address tag with the tag outputted by the tag memory and generating a tag hit bit;
a plurality of trace protection units, each generating a locking bit and a hit bit according to a corresponding one of the plurality of cache way control bits, the plurality of states of row outputted by the tag memory and the tag hit bit; and
a plurality of trace dump units, each generating a writeback address according to a corresponding one of the plurality of cache way control bits, the plurality of row addresses, the plurality of states of row and the predetermined trace address.

2. The processor capable of storing trace data as claimed in claim 1, wherein the data/trace cache control register is electrically connected to the line index calculator, the plurality of data/trace configuration units, the plurality of trace protection units and the plurality of trace dump units, wherein the plurality of data/trace configuration units is electrically connected to the line index calculator, the cache controller and the data memories, wherein the plurality of comparators is electrically connected to the plurality of trace protection units and the tag memories, wherein the tag memories are electrically connected to the plurality of trace protection units and the plurality of trace dump units, and wherein the plurality of trace dump units is electrically connected to the write back address memories.

3. The processor capable of storing trace data as claimed in claim 1, wherein the cache memory further comprises a cache way selector, a first multiplexer and a second multiplexer, wherein the cache way selector generates a trace selection bit according to the hit bit, wherein the first multiplexer outputs data from the data memory of the core way or from the data memory of the trace way according to the trace selection bit, and wherein the second multiplexer outputs data from the data memory of the core way or from the data memory of the trace way according to the cache way cleaning bit.

4. The processor capable of storing trace data as claimed in claim 1, wherein the data/trace cache control register comprises an address register and a control register, wherein the address register stores the predetermined trace address and is electrically connected to the plurality of trace dump units, and wherein the control register stores the plurality of cache way control bits and is connected to the line index calculator, the plurality of data/trace configuration units, the plurality of trace protection units and the plurality of trace dump units.

5. The processor capable of storing trace data as claimed in claim 1, wherein the line index calculator comprises a third multiplexer, a register, an adder, a fourth multiplexer, an address decoder, a comparator, a data writing controller, a fifth multiplexer and a bus, wherein the third multiplexer is connected to the register, the adder and a trace valid port, wherein the fourth multiplexer is connected to the third multiplexer, the register, the adder, the address decoder, the comparator and the data/trace cache control register, wherein the data writing controller is connected to the address decoder, the comparator and the fifth multiplexer, wherein the fifth multiplexer is connected to the trace valid port, and wherein the bus is connected to a trace data input port.

6. The processor capable of storing trace data as claimed in claim 1, wherein each of the plurality of data/trace configuration units comprises a first AND logical gate, a sixth multiplexer, a seventh multiplexer and an eight multiplexer, wherein the first AND logical gate is connected to the data/trace cache control register and the line index calculator, wherein the sixth multiplexer is connected to the first AND logical gate, the line index calculator and a core address input port, wherein the seventh multiplexer is connected to the first AND logical gate, the line index calculator and the cache controller, and wherein the eight multiplexer is connected to the first AND logical gate, the line index calculator and the cache controller.

7. The processor capable of storing trace data as claimed in claim 1, wherein each of the plurality of trace protection units comprises a first OR logical gate, a NOT logical gate and a second AND logical gate, wherein the first OR logical gate is electrically connected to the data/trace cache control register and the tag memory, wherein the NOT logical gate is electrically connected to the data/trace cache control register, and wherein the second AND logical gate is electrically connected to the NOT logical gate and the comparator.

8. The processor capable of storing trace data as claimed in claim 1, wherein each of the plurality of trace dump units comprises a ninth multiplexer, a second OR logical gate and a third OR logical gate, wherein the ninth multiplexer is connected to the data/trace cache control register and the write back address memory, wherein the second OR logical gate and the third OR logical gate are electrically connected to the tag memory.

9. The processor capable of storing trace data as claimed in claim 1, wherein the cache memory further comprises a pipeline register electrically connected between the line index calculator and the plurality of data/trace configuration units.

10. The processor capable of storing trace data as claimed in claim 1, further comprising a trace generation unit electrically connected to the line index calculator of the cache memory.

11. A cache memory of a processor capable of storing trace data, comprising:
a core way;
a trace way, wherein each of the core way and the trace way comprises a data memory, a tag memory and a write back address memory, wherein the data memories of the core way and the trace way are adapted to store data, wherein the tag memory stores a plurality of states of row and a plurality of tags, and selects one of the plurality of states of row and one of the plurality of tags according to an address outputted by the core, wherein the write back address memory is adapted to store a plurality of row addresses;
a data/trace cache control register adapted to store a predetermined trace address and a plurality of cache way control bits, wherein each of the plurality of cache way control bits corresponds to a respective one of the data memories and comprises two state values;
a line index calculator generating a trace address, a trace data and a trace enabling bit according to the plurality of cache way control bits, a valid trace bit and a data that is generated during the debugging operations of the core;
a cache controller generating a core data, a core enabling bit and a cache way cleaning bit according to the address outputted by the core and a data that is required when the core executes programs, wherein the address comprises a set index and an address tag;
a plurality of data/trace configuration units, each corresponding to a respective one of the plurality of cache way control bits, wherein each of the plurality of data/trace configuration units controls the core data to be written into the data memory according to one of the two state values of the cache way control bit, the set index and the core enabling bit, or controls the trace data to be written into the data memory according to another one of the two state values of the cache way control bit, the trace address and the trace enabling bit;
a plurality of comparators, each comparing the address tag with the tag outputted by the tag memory and generating a tag hit bit;
a plurality of trace protection units, each generating a locking bit and a hit bit according to a corresponding one of the plurality of cache way control bits, the plurality of states of row outputted by the tag memory and the tag hit bit; and
a plurality of trace dump units, each generating a write-back address according to a corresponding one of the plurality of cache way control bits, the plurality of row addresses, the plurality of states of row and the predetermined trace address.

12. The cache memory of the processor capable of storing trace data as claimed in claim 11, wherein the data/trace cache control register is electrically connected to the line index calculator, the plurality of data/trace configuration units, the plurality of trace protection units and the plurality of trace dump units, wherein the plurality of data/trace configuration units is electrically connected to the line index calculator, the cache controller and the data memories, wherein the plurality of comparators is electrically connected to the plurality of trace protection units and the tag memories, wherein the tag memories are electrically connected to the plurality of trace protection units and the plurality of trace dump units, and wherein the plurality of trace dump units is electrically connected to the write back address memories.

13. The cache memory of the processor capable of storing trace data as claimed in claim 11, wherein the cache memory further comprises a cache way selector, a first multiplexer and a second multiplexer, wherein the cache way selector generates a trace selection bit according to the hit bit, wherein the first multiplexer outputs data from the data memory of the core way or from the data memory of the trace way according to the trace selection bit, and wherein the second multiplexer outputs data from the data memory of the core way or from the data memory of the trace way according to the cache way cleaning bit.

14. The cache memory of the processor capable of storing trace data as claimed in claim 11, wherein the data/trace cache control register comprises an address register and a control register, wherein the address register stores the predetermined trace address and is electrically connected to the plurality of trace dump units, and wherein the control register stores the plurality of cache way control bits and is connected to the line index calculator, the plurality of data/trace configuration units, the plurality of trace protection units and the plurality of trace dump units.

15. The cache memory of the processor capable of storing trace data as claimed in claim 11, wherein the line index calculator comprises a third multiplexer, a register, an adder, a fourth multiplexer, an address decoder, a comparator, a data writing controller, a fifth multiplexer and a bus, wherein the third multiplexer is connected to the register, the adder and a trace valid port, wherein the fourth multiplexer is connected to the third multiplexer, the register, the adder, the address decoder, the comparator and the data/trace cache control register, wherein the data writing controller is connected to the address decoder, the comparator and the fifth multiplexer, wherein the fifth multiplexer is connected to the trace valid port, and wherein the bus is connected to a trace data input port.

16. The cache memory of the processor capable of storing trace data as claimed in claim 11, wherein each of the plurality of data/trace configuration units comprises a first AND logical gate, a sixth multiplexer, a seventh multiplexer and an eight multiplexer, wherein the first AND logical gate is connected to the data/trace cache control register and the line index calculator, wherein the sixth multiplexer is connected to the first AND logical gate, the line index calculator and a core address input port, wherein the seventh multiplexer is connected to the first AND logical gate, the line index calculator and the cache controller, and wherein the eight multiplexer is connected to the first AND logical gate, the line index calculator and the cache controller.

17. The cache memory of the processor capable of storing trace data as claimed in claim 11, wherein each of the plurality of trace protection units comprises a first OR logical gate, a NOT logical gate and a second AND logical gate, wherein the first OR logical gate is electrically connected to the data/trace cache control register and the tag memory, wherein the NOT logical gate is electrically connected to the data/trace cache control register, and wherein the second AND logical gate is electrically connected to the NOT logical gate and the comparator.

18. The cache memory of the processor capable of storing trace data as claimed in claim 11, wherein each of the plurality of trace dump units comprises a ninth multiplexer, a second OR logical gate and a third OR logical gate, wherein the ninth multiplexer is connected to the data/trace cache control register and the write back address memory, wherein the second OR logical gate and the third OR logical gate are electrically connected to the tag memory.

19. The cache memory of the processor capable of storing trace data as claimed in claim 11, wherein the cache memory further comprises a pipeline register electrically connected between the line index calculator and the plurality of data/trace configuration units.

20. A control method of a processor capable of storing trace data, wherein the processor comprises a core and a cache memory, wherein the cache memory comprises a data/trace cache control register, a line index calculator, a cache controller, a plurality of data/trace configuration units, a plurality of comparators, a plurality of trace protection units, a plurality of trace dump units, a plurality of data memories, a plurality of tag memories and a plurality of write back address memories, wherein the data/trace cache control register is electrically connected to the line index calculator, the plurality of data/trace configuration units, the plurality of trace protection units and the plurality of trace dump units, wherein the plurality of data/trace configuration units is electrically connected to the line index calculator, the cache controller and the data memories, wherein the plurality of comparators is electrically connected to the plurality of trace protection units and the plurality of tag memories, wherein the plurality of tag memories is electrically connected to the plurality of trace protection units and the plurality of trace dump units, wherein the plurality of trace dump units is electrically connected to the plurality of write back address memories, the control method comprises:

setting the data/trace cache control register by the core to operate one of the plurality of data memories, one of the plurality of tag memories and one of the plurality of write back address memories as one trace way;

testing the core by a trace generation unit and retrieving an output signal of the core as a trace data;

generating a storage address of the trace data by a line index calculator;

writing the trace data into the data memory of the trace way according to the storage address by one of the plurality of data/trace configuration units;

determining whether the data memory of the trace way is full by the data/trace configuration unit, updating the storage address by the line index calculator if the data memory of the trace way is not full, allowing the data memory of the trace way to store a further trace data;

prohibiting the trace data from being written into the data memory of the trace way by the line index calculator if the data memory of the trace way is full;

outputting the trace data stored in the data memory of the trace way; and cleaning the data memory of the trace way by the core.

21. The control method of the processor capable of storing trace data as claimed in claim 20, further comprising the following steps after the testing of the trace generation unit is finished:

executing an instruction by the core to clean the data stored in any line address of the data memory;

determining whether the line address is located in the data memory of the trace way by the cache controller;

writing the data of the line address into a corresponding memory address of a chip input/output interface and repeatedly performing the determining step of the cache controller until the data of the data memory of the trace way is completely written into the corresponding memory address of the chip input/output interface if the line address is located in the data memory of the trace way; and writing the data of the line address into a corresponding address of an external memory if the line address is not located in the data memory of the trace way.

* * * * *